(12) United States Patent
Ødegård (10) Patent No.: US 6,435,123 B1
(45) Date of Patent: Aug. 20, 2002

(54) HIGH SPEED HYBRID MARINE VESSEL

(76) Inventor: Rune H. Ødegård, Nordåsen 72, N-6823 Sandane (NO)

( * ) Notice: Subject to any disclaimer, the term of this patent is extended or adjusted under 35 U.S.C. 154(b) by 0 days.

(21) Appl. No.: 09/701,452

(22) PCT Filed: May 28, 1999

(86) PCT No.: PCT/NO99/00167
§ 371 (c)(1),
(2), (4) Date: Nov. 28, 2000

(87) PCT Pub. No.: WO99/62760
PCT Pub. Date: Dec. 9, 1999

(30) Foreign Application Priority Data

May 29, 1998 (NO) .................................................. 982454
Jan. 12, 1999 (NO) .................................................. 990113

(51) Int. Cl.⁷ .................................................. B63B 1/26
(52) U.S. Cl. ...................... 114/274; 114/61.1; 114/125; 114/283
(58) Field of Search ........................ 114/274–283, 61.1, 114/125, 39.27

(56) References Cited

U.S. PATENT DOCUMENTS 3,871,317 A    3/1975    Szpytman .................. 114/66.5
RE28,615 E  * 11/1975    Keiper
4,348,972 A    9/1982    Parsons ........................ 114/61
5,178,085 A    1/1993    Hsu ............................. 114/61
5,529,009 A    6/1996    Faury et al. .................. 114/61

FOREIGN PATENT DOCUMENTS

| EP | 0 455 605 A1 | * 11/1991 |
| JP | 63-130492 | * 6/1988 |
| NO | 175199 | 6/1994 |
| WO | 00/07874 | 2/2000 |

* cited by examiner

Primary Examiner—Sherman Basinger
(74) Attorney, Agent, or Firm—Nath & Associates PLLC; Gary M. Nath; Marvin C. Berkowitz (57) ABSTRACT

A high speed hybrid marine vessel with integrated hydrodynamic lift-generating, roll stabilizing and pitch controlling wings, or hydrofoils, operable in two distinctly different modes, namely a hydrostatic stable low speed mode, featuring a positive GM-value with at least three submerged hull elements; and a hydrostatic unstable high speed mode, featuring a negative GM-value with only one submerged hull element, the hull elements being integrated to the vessel via an integrated deck construction connecting the side hulls to the main hull.

22 Claims, 7 Drawing Sheets

HIGH SPEED HYBRID MARINE VESSEL

BACKGROUND OF THE INVENTION

1. Field of the Invention

Present invention generally relates to marine vessels and particularly a hydrofoil assisted high speed hybrid hull featuring a slender central hull element and two or more side hull elements, the vessel basically operating as a hydrofoil stabilized super-slender monohull in the normal high speed mode.

2. Description of the Related Art

Among modern high speed vessels, the catamarans have over the two last decades gained a dominating market position over monohulls, particularly of size less than 100 meters. This type of vessel is characterized by its simplicity of operation, high stability and relatively high speed- and seakeeping capabilities, particularly in the speed regime of 30–35 knots. The marked, however, seems to continue putting increased demands to speed performance, and several catamarans making 45 knots, and exceptionally above 50 knots, have recently become a reality. Seakeeping performance has also become a major issue in modem high-speed marine transportation. These demands have resulted in larger propulsion power plant installations and the introduction of active motion damping systems, like T-foils located in the bow region and trim-tabs or interceptors located aft, for improvement of ride comfort. The introduction of T-foils, which basically are non permanent lift generating devices, however, is associated by a notable drag that reduces the speed with approximately 2–3 knots on a 40–45 knots catamaran.

Parallel with the increased speed demands on certain routes, most fast ferry operators are still reluctant to join this trend of development because of the associated sky-rocking fuel consumption. It is very likely that the catamaran technology, initially commercially developed during the early seventies, today have reached its optimum stage of development from a hydrodynamic point of view. Further reduction of drag is severely limited by the fact that the major drag component is related to hydrodynamic skin friction. To overcome this, either wetted surface area has to be reduced, or the skin friction has to be reduced by application of new technology, like air lubrication. Recognizing the lack of proven means to solve these technological challenges, it indicates that the catamaran concept, as we know it today, is no longer particularly suited to fully comply with the future marked needs in all respects. This view is supported by the increased attention concerning environmental issues paid by the public and authorities, which is likely to force through the development of novel concepts that performs better in this respect. Also the environment effects of the wave-making tendency of high speed crafts has become a growing regional concern.

The surface piecing hydrofoils were commercially developed in the mid fifties and produced in series by Rodriquez, Italy. As known, these are based on a monohull fitted with a forward- and aft-located surface piecing hydrofoil arrangement, which in the transverse section features a V-like shape of the foil span. Thus parts of the foil span protrude the waterline on both sides, and provide a transverse righting momentum when the craft heels causing the surface piercing foil span to be submerged. The hull is completely lifted out of the water at higher speed, being self stabilized in roll and pitch by the surface piecing hydrofoil arrangement. It is propelled by fully submerged propellers, mounted on inclined shafts. The advantages of this conceptual design over traditional monohulls of similar size were improved seakeeping and power-to-speed efficiency at service speed around 35 knots. The disadvantages were larger complexity, building costs, weight- and speed restriction. Therefore the design is generally limited to an overall length of around 40 m and maximum displacement of around 150 tons. The design became very popular as passenger ferries, and today there is still a large number of these operating around the world, particularly in previous Russian countries, Japan and the Mediterranean countries. According to the inventor's opinion, there is probably no other high-speed concept that has transported the same amount of passengers so far. Compared to modern type high speed crafts, like catamarans and monohulls, the design has lost it's popularity, and can no longer compete in terms of speed requirements and passenger comfort, though it still maintain an edge over these regarding speed-to-power efficiency.

On of the most significant steps in high-speed marine technology development came in the mid seventies when Boeing, USA, developed the Jetfoil. As the Rodriquez hydrofoils, the conceptual design is based on a monohull that is lifted clear of the waterline at higher speed, However, the foil system is based on the fully submerged type, which consists of a substantially plane fully submerged foil span supported by three vertical struts. As opposed to the surface-piercing hydrofoil, it is not self-stabilizing and therefore depends on controllable flaps integrated to the following edge of the foilspan. The primary foil is located aft extending to the full width of the craft, and provides the primary lift and roll stabilization. A lesser foil (T-foil) is located in the centerline forward and supported by a vertical strut. This provides a secondary lifting force as well as the required pitch controlling momentum. All foils can be tilted upward when the craft is in a fully displacement mode. The 27.4 m and 117 tons displacement Jetfoil design has a normal service speed in foil-born mode of around 45 knots. This design has the advantage of excellent seakeeping and high speed-to-power efficiency. The disadvantages, however, are high building costs, technical complexity, overall weight- and payload capacity restrictions.

In the early nineties, Kvaerner Fjellstrand and Westamarin, both Norway, developed the Foilcat concept. This is basically a catamaran fitted with a fully submerged foil system that lifts the craft clear of the waterline, and operates at a service speed of around 45 knots. The largest design is 35 m and has a maximum displacement of around 175 tons. It is described in Norwegian patent no. 175199. The design has basically the same advantages and disadvantages as the Jetfoils. This has limited its commercial acceptance. In order to reduce the large frictional resistance related to catamarans operating at speeds of around 45 knots, there is a resent trend towards developing foil assisted catamarans that is fitted with a fully submerged foil system for the purpose of lifting the hull partially out of the water. At the same time it is controlling the pitch, and to less degree roll and hive. Examples of these are U.S. Pat. No. 4,606,291 and U.S. Pat. No. 4,665,853. Since they are operating in a partial displacement mode, and as such still have two hulls submerged in the water, they are still left with a major frictional drag.

The trimaran design has gained increased reputation within the sailboat environment due to its high speed- and seakeeping capabilities. As known, the trimaran design consists of three fully submerged hull elements, including a long and narrow center hull and a pair of shorter outrigger hulls or sidehulls, integrated to the underside of a transverse bridging structure located midship or aft. However, this design is yet not brought into use in the high-speed ferry marked. Variations of this design are described in various patents and patent applications, like U.S. Pat. No. 4,348,972, U.S. Pat. No. 5,178,085, U.S. Pat. No. 5,529,009, JP 63130492, WO 93/07046, WO 94/20359, WO 97/10988 and EP455605. Some of these incorporate lifting devices in the form of T-foils fitted to the sidehulls and the center hull, for the purpose of damping roll and pitch motion. However, they all operate in a constant displacement mode with three hulls submerged.

A foil assisted hybrid marine vessel is described in U.S. Pat. No. 5,503,100. However, this particular invention seems to be impaired by a number of impracticable attributes that is likely to render the invention inapplicable as a high-speed craft. The reason for this being a combination of its complex hull geometry, unorthodox arrangement of the propulsion- and foil system, that ultimately will result in excessive overall weight and frictional drag.

SUMMARY OF THE INVENTION

The present novel design in a preferred version, is a hybrid between a monohull and trimaran. As known, the so-called Froude's number, expressed by the formulae;

$$Fn = v/\sqrt{g*L}$$

where, v=speed (m/s), g=gravitational acceleration, L=water line length (m)
plays an important role on a vessel's wave-making resistance. Traditional trimarans featuring fully submerged sidehulls, tend to operate in a planing regime when the length of the sidehulls are short and the speed is sufficiently high. Due to stability requirements, implying a certain positive metacentric height (+GM), these tends to require a relatively large submergence of the side-hull in relation to its length, which generally leads to the risk of substantial increased wave-making drag at higher speed and Froude number.

The present invention is based upon a hybrid hull geometry consisting of a combination of an improved variation of the above mentioned trimarans and a monohulls, consisting of a deep slender central hull element and at least a pair of slender and shallow side hull elements being integrated to the vessel via a stiff deck construction connecting the side hull elements to the central hull element, and operating in two distinctly different modes, namely a hydrostatic stable lower speed mode, featuring a positive metacentric height (+GM) with the central hull element and at least one of the side hull elements submerged, and a hydrostatic unstable higher speed mode featuring a partly lifted, partly submerged central hull with a negative metacentric height (−GM) while the side hull elements are partly or entirely above the waterline, the transition from the one mode to the other being augmented by hydrodynamic lift-generating, roll-, heave and pitch controlling wings or hydrofoils, the vessel being characterized by a combination of following:

that the central hull element itself features a large water line length in relation to the water line width, and a large main deck width in relation to the water line width;

that the central hull element below it's wet deck level has a transverse section as shown on FIG. 4a–d and 4e–m over a major portion of its length, eventually a combination of these;

that the side hull elements have a depth that is less, eventually substantially less that the depth of the central hull element, eventually of adjustable height, being positioned in the longitudinal direction such that a major portion lies aft of the vessels longitudinal center of gravity, or close to said center of gravity, and symmetrically about the vessels center line;

that at least one primary hydrodynamic wing- or hydrofoil arrangement is located between and below the central hull element and the side hull elements, integrated to these through vertical struts, eventually also to the in-between-laying wet deck construction through at least one vertical strut on each side of the vessel's center line, that at least one secondary hydrodynamic wing- or hydrofoil arrangement is located at an aft or forward position on the central hull element, eventually on both location, integrated to the vessel through at least one vertical strut for each set of hydrofoil arrangement, eventually also to the in-between-laying wet deck construction;

that the wings or hydrofoils are located such the center of hydrodynamic lift is located on or near the vessels longitudinal center of gravity;

that the hydrodynamic lift force generated by the hydrofoil arrangement at maximum speed is at least 20% of the lightest weight of the vessel that the side hull elements consists of structurally integrated or independently fastened elements located below the wet deck and made of a stiff construction material or a flexible shock absorbing elastomeric material all over its length, or over a major portion of its length;

that the side hull elements contain flotation elements that are adjustable in the height all over the length of the side hull elements, or over a major portion of their length;

that the central hull element, preferably on larger vessels, is equipped with a water ballast tank, featuring a permanent opening located in the bottom plate of said hull at a distance forward of the said hull's transom, for quick self- priming and draining, eventually equipped with means of remote controlled priming and draining.

In a preferred embodiment, the vessel is equipped with a fully submerged lift generating roll stabilizing and hive-damping primary hydrofoil arrangement located underneath and between the central hull element and the side hull elements, close to the vessels longitudinal center of gravity (LCG), and fixed to the central hull element, to the in-between-laying wet deck construction and the side hull elements by means of vertical, eventually also inclined, struts, and a secondary hydrodynamic lift generating and pitch controlling hydrofoil located aft, alternatively forward or both places, and fixed to the central hull element, eventually also to the in-between-laying wet deck construction, depending on the transverse span of the hydrofoil arrangement by means of vertical struts.

Figure 8:
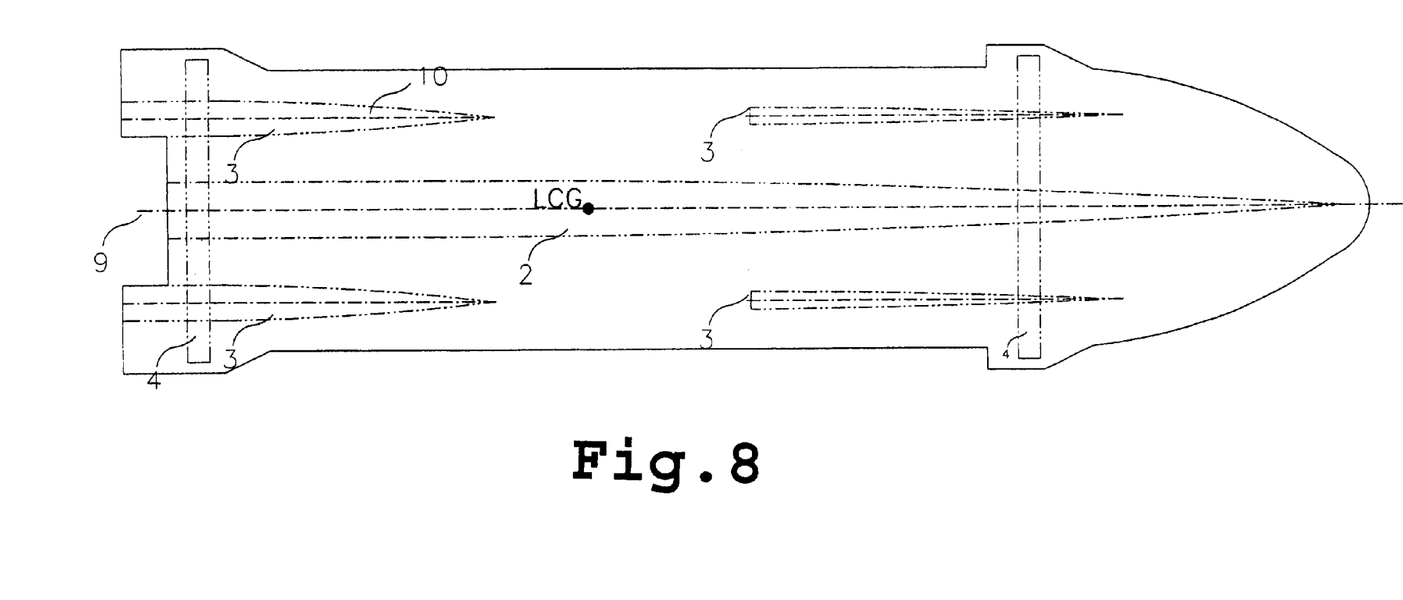
FIG. 8 illustrates the plan of a larger vessel with two sets of primary hydrofoils and two sets of sidehulls.

In another preferred version, particularly suited for vessels larger than 100 m, the vessel is equipped with two primary lift generating, roll stabilizing and pitch controlling high-aspect-ratio hydrofoils. Since vessels of this size normally will have full load displacement well in excess of 1000 metric tons, it may be desirable with respect to optimizing overall drag that the foil width is increased beyond the normal width of the vessel in order to provide a lift-to-displacement ratio in the range of 50% at 40–45 knots speed. Such an arrangement is shown in FIG. 8. Here, parts of the deck construction are extended transversely beyond the normal width of the vessel in order to facilitate support for the outer struts of the foils. These bridge constructions may also facilitate mooring as well as embarkation and disembarkation stations.

For larger versions, like approximately 200 m or larger, three primary lift generating foils may be feasible. In such a case their approximate location should be aft, forward and midship.

High speed hybrid marine vessel according to present invention is fitted with hydrodynamic lift-generating, roll-, heave and pitch controlling wings or hydrofoils, operating in two distinctly different modes, a hydrostatic stable lower speed mode, featuring a positive metacentric height (+GM), Keith the central hull element and at least one of the side hull elements submerged, and a hydrostatic unstable higher speed mode, featuring a negative metacentric height (−GM) with the slender central hull element partially lifted, partially submerged while the side hull elements are partly or entirely out of the water, while said vessel is being dynamically stabilized by the hydrofoil system, consisting of a central hull element featuring an integrated stiff deck construction, that in the transverse direction protrudes beyond the width of the central hull element and where the lower surface of said deck construction, defined as the wet deck lays above the water line when the vessel is at rest at an intact condition, and at an increasing height above the mean water line when the vessel's forward speed is substantially increased, said vessel has a relation between the largest frame width above the waterline and the largest frame width of the central main element at a waterline representing any intact upright floating condition of at least 2, said central hull element has a relation between the largest water line length and the largest water line width at any intact upright floating condition of at least 6, said central hull element has a rectangular- or trapezoidal like shaped transverse section below the wet deck level at an aft location, gradually turning into a U-, V- and Y-shape closer to the bow, eventually a combination of these, said vessel is provided with at least one set of side hull elements arranged such that one set consists of one side hull element located on each side of the vessel's longitudinal centerline integrated below the wet deck, and featuring a depth that is less, eventually substantially less that the depth of the central hull element such that the ratio between the depth of the side hull elements and the depth of the central hull element is less than 0.7, the depth being measured from the lowest continuous deck running from the aft to the forward part of the vessel to the lowest part of the bottoms of said hull elements, said side hull elements are in a preferred embodiment being located entirely or partly within the width envelope of above defined lowest continuous deck, said side hull elements are in a preferred embodiment positioned such that a major portion of them lies aft of the vessels longitudinal center of gravity, said side hull elements are in a preferred embodiment positioned such that the longitudinal location of their transom, lies aft of the transom of the central hull element, said side hull elements are in a preferred embodiment located such that they are parallel to the vessel's longitudinal center line, or at a minor inboard or outboard angle, and that said side hull elements are arranged symmetrically about the said vessel's center line on both sides, said side hull elements may, preferably on larger size vessels, be arranged one forward of the other on both sides in the longitudinal direction so that the vessels longitudinal center of gravity is located between the transom of the aft side hull elements and the bow of the forward side hull elements, the wet deck is in the longitudinal direction at least extending from the upper and foremost part of the bow of the side hull elements to the transom of the central hull element, and features in the longitudinal direction an arc shape with the endpoints located at an higher level than any point elsewhere along the arc, or is in it's entirety, or parts there off, horizontal, or in an angle to the horizontal plane with the aft end at a higher level than a point on the wet deck plane in between, eventually with a combination of an arc shaped middle part and angular oriented fore- and aft parts, said wet deck is in the transverse direction horizontal or in an angular position, such that a point on said wet deck farther away form the vessel's center line, lies at the same level, or on a higher level, as a point on said wet deck located closer to said center line.

In a preferred embodiment, said hybrid marine vessel further includes an arrangement constituting a set of fully submerged primary hydrodynamic wing or hydrofoil where the total transverse span of said hydrofoil arrangement corresponds at least to 50%, preferably close to 100%, of the largest overall width of the vessel, where said hydrofoil is located close to the vessel's longitudinal center of gravity, or more precisely slightly forward of said point, fixed to the central hull element, the wet deck and the side hull elements, eventually parts of the wet deck or deck construction extending transversely beyond the said side hull elements, or to some of these structural elements dependent on the transverse span of said hydrofoil arrangement, by means of at least two vertical and/or inclined struts, that transfer the hydrodynamic lifting force to the vessel, normally an upwards directed force, and where it is provided at least one, preferably several, remotely controllable flap on each side of the vessel's center line integrated to the trailing edge of the hydrofoil span, providing the required hydrodynamic stability by executing a controllable transverse righting momentum about the vessel's centerline when the vessel moves forward at higher speed with the side-hull elements partly submerged or entirely above the mean waterline.

In a further preferred embodiment, said hybrid marine vessel includes an arrangement constituting at least one fully submerged secondary hydrodynamic wing or hydrofoil where the total transverse span of said hydrofoil arrangement is less than 50% of the largest overall width of the vessel, and where one set of said secondary hydrofoil arrangement is located substantially aft of the vessel's longitudinal center of gravity, fixed to said central hull element and/or the wet deck, by means of at least one strut for each set of said hydrofoil that transfer the hydrodynamic force to the vessel, and where at least one remotely controllable flap for each set of said hydrofoil is integrated to the trailing edge, providing the required pitch regulating momentum about the vessels longitudinal pivoting center by executing a controllable longitudinal righting momentum when the vessel moves forward at higher speed.

BRIEF DESCRIPTION OF THE DRAWINGS

The present invention will be explained further by reference to the enclosed figures, where.

DETAILED DESCRIPTION OF THE INVENTION

Figure 1:
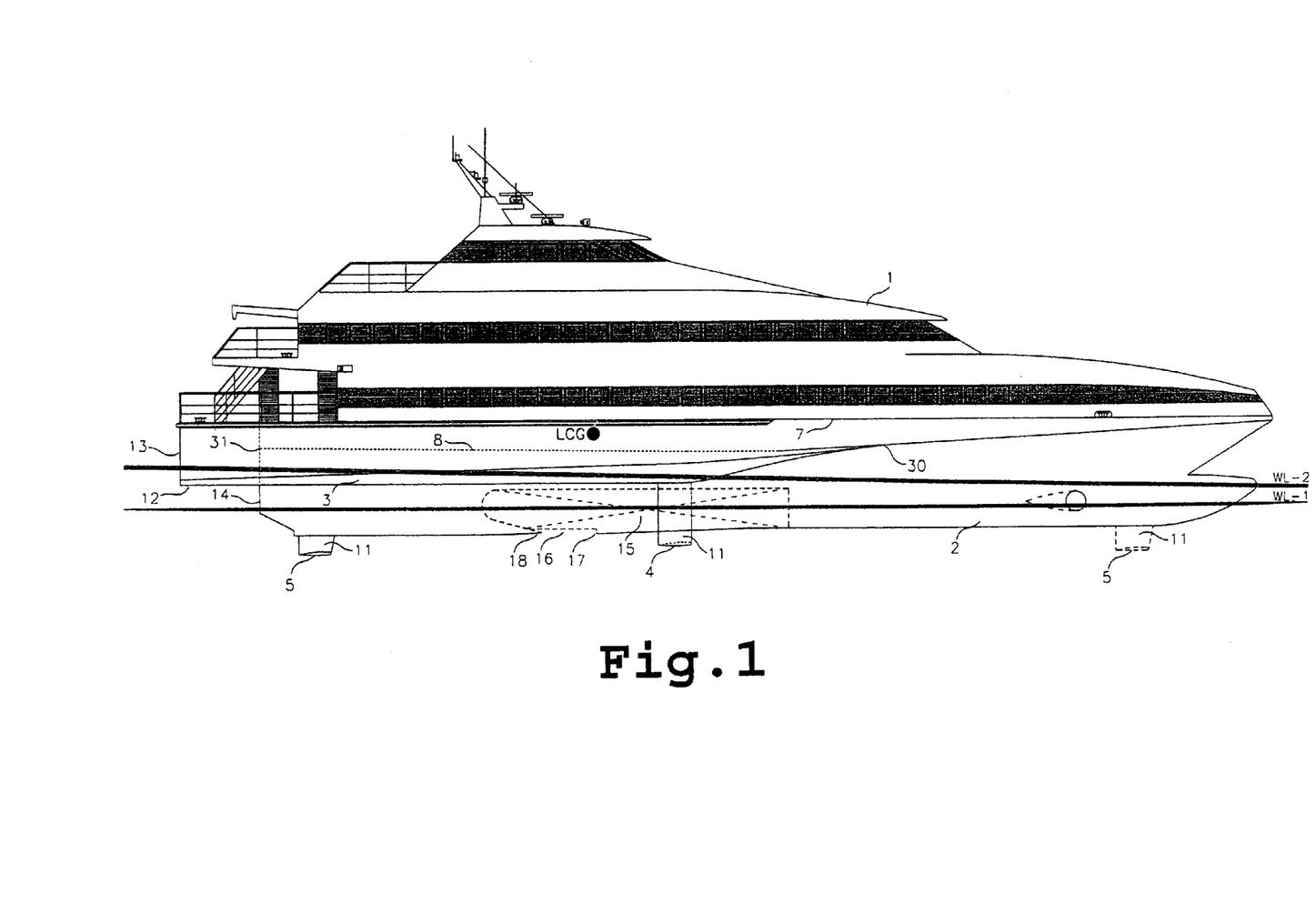
FIG. 1 shows the hybrid marine vessel according to the invention, viewed from the side.

FIG. 1 shows a profile of the hybrid marine vessel (1) with the central hull element (2) and the side hull elements (3). Below the vessel, the primary hydrofoil (4) system and vertical struts (11), as well as the secondary hydrofoil (5) system, are shown.

Figure 2:
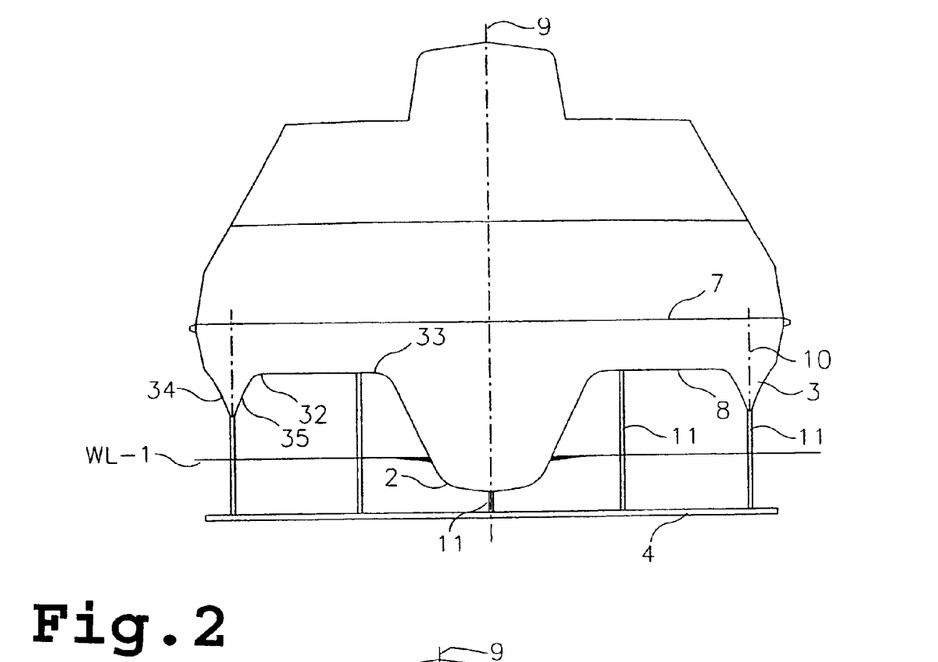
FIG. 2 shows the vessel according to FIG. 1, a midship transverse section through the primary hydrofoil, indicating the main hull, wet deck and sidehulls.
Figure 9:
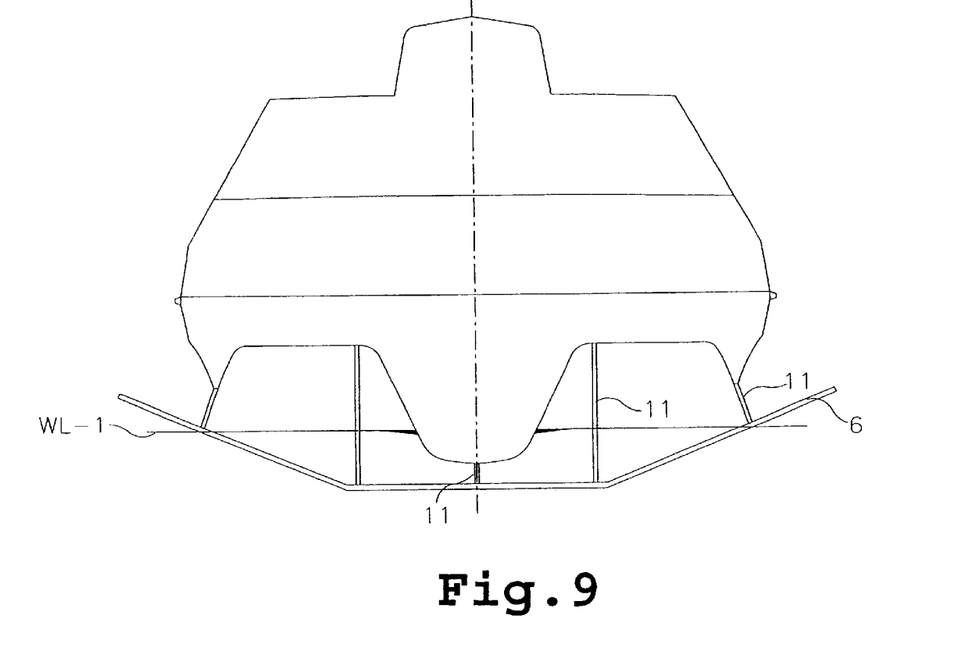
FIG. 9 shows a transverse section through the vessel equipped with a surface piercing primary hydrofoil.
Figure 10:
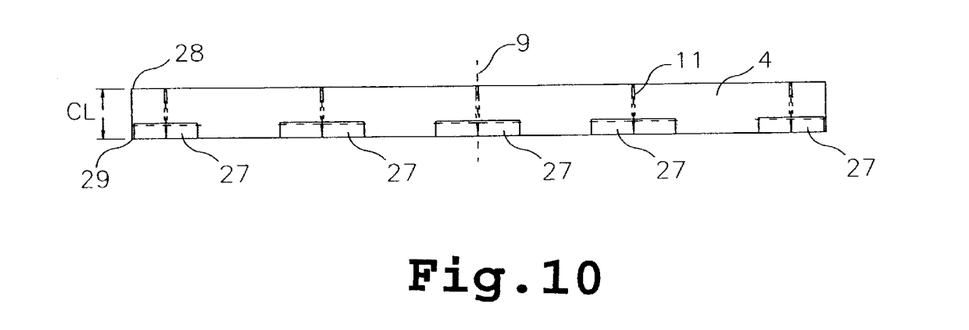
FIG. 10 shows a plan of a fully submerged primary hydrofoil, indicating leading- and following edge, chord length (CL) and controllable flaps.

As described, an arrangement constituting a primary hydrodynamic wing or hydrofoil (4), is located between the central hull element (2) and the side hull elements (3), which provide a major hydrodynamic lift force, that results in reduced draft and decreased wetted hull surface, while it simultaneously provide dynamic stability through a surface piercing hydrofoils system (6), as shown on FIG. 9, or preferably a fully submerged foil system (4) supported by vertical struts (11) as shown on FIG. 2, featuring a fully controllable hydrofoil span, or preferably controllable flaps (27) integrated along the trailing edge (29) of said foil span (4). At a speed of 45 knots, the hydrodynamic lift generated by the foil system can attain values corresponding to 20–90% of the light ship displacement, depending on the size of the foil system and the displacement of the vessel. As an effect of this, the vessel will be lifted sufficiently up in the water so that the side hull elements partly or entirely clear the water line.

This gives the vessel a major advantage concerning hydrodynamic drag compared to a traditional catamaran that eventually is lifted correspondingly. The basic reason for this is that the wetted area of the central hull element according to present invention is less than the combined area of the two hulls of a catamaran when the total displacement is the same. This fact contributes, together with the effects of the foil generated lift, to a major reduction of wetted surface. Hence, it leads to a major reduction of skin frictional resistance, which renders the concept exceptionally well suited as a high- speed transportation platform.

Contrary to traditional catamarans, that is characterized by a high metacentric height (GM) that results in high hydrostatic stability, or roll stiffness, the vessel according to present invention initially has lower hydrostatic stability at small angles of inclination when at rest in the water. With increased speed and lift generated by the hydrofoil system, the hydrostatic stability becomes further reduced. When the speed and lift is high enough, and the side hull elements clear the waterline, the vessel according to present invention will enter a completely hydrostatic unstable condition. Such a condition is characterized by a negative metacentric height (–GM), which generally is defined as the vertical distance between a vessel's vertical center of gravity (VCG), and an imaginary metacentric point (M) on a vertical line through the vessel's centerline. At small angles of inclination said vertical line will be crossing itself at a given point, normally above the vertical center of gravity (VCG). The larger the distance the metacentric point is located above said point, the higher the hydrostatic stability and the metacentric height (+GM) will be. An unstable vessel is therefore generally associated with a low, or negative metacentric height (–GM), meaning the metacentric point is below the vertical center of gravity (VCG).

FIG. 4 shows, as above indicated, various geometric formes of the central hull element that are examples of labile or hydrostatic unstable hull forms on the indicated waterline (WL-1).

First line of hull forms shown on FIG. 4, indicated a–d, shows four possible transverse hull shapes of the aft part of the central hull element below the wet deck level. As indicated, it may consist of the principally distinguished rectangular-, U-, or trapezoidal shapes that gradually turns into U-, V- and Y-shapes at a forward position. To the right, the various referenced levels are indicated, namely water line (WL-1), wet deck level (8) and main deck level (7).

The remaining variants of FIG. 4, e–m, show possible transverse hull shapes of the forward part of the central hull element below the main deck level (7). As indicated, it may consist of the principally distinguished V-, U- or Y-shapes, or combinations of these.

The dynamic stability operating principle applied to the hybrid marine vessel according to the present invention, is basically similar to those applied on modern jet-fighter planes. As known, these types of planes are aerodynamically unstable, and can not be manually controlled as opposed to the conventional stable planes that can be controlled by the pilot. Therefore they are computer controlled in a principally identical way as the vessel according to present invention. Needless to say, they are statically stable when supported by the wheels on the ground, similar to the present hybrid vessel when at rest or at low speed. A more down to the earth example is the bicycle, which also is statically unstable and can not be balanced without a fighting momentum being applied to it.

A static unstable condition is very advantageous with respect to achieving high ride comfort by utilizing an active dynamic stabilization effect provided by the controllable flaps on the hydrofoil. The externally excitation forces represented by the wave impacts on the hull is naturally much less for a hull according to present invention characterized by a negative metacentric height (–GM), as opposed to a traditional catamaran vessel characterized by a high positive metacentric height (+GM). This is particularly the case in beam waves that cause roll motions. In effect this results in that the vessel according to the present invention will exert limited or no roll motions dependent on the wave height, while the said catamaran have no ways to avoid this, even if equipped with a hydrofoil system of same capability.

Since only the central hull element is submerged in the water, typically featuring a considerably less water plane area than a catamaran or a traditional monohull, also the vertical heave movements are reduced. These are further reduced due to the combination of passive and active heave damping of the relatively large primary hydrofoil located near the longitudinal center of gravity (LCG), as indicated on FIG. 1.

Under a normal service condition where the speed typically will be 40–50 knots, the vessel will have a dynamic stability margin against roll excited by side waves that can be compared to the Foilcat designs that are lifted completely above the water. This is so because the side hull elements have considerably less displacement compared to the side hulls of said Foilcats. With respect to the pitch movements, the aft or forward located secondary hydrofoil, or trim foil, will generate a major pitch damping effect. This renders the vessel according to the present invention unique seakeeping capabilities.

When designing such a vessel, due attention has to be said to features like the depth and buoyancy of the central hull element, side hull elements, location of vertical center of gravity (VCG), longitudinal center of gravity (LCG) and the lift center of the foil system. To arrive at a vessel that is optimized from an performance point of view, requires a delicate balance and compromise between these factors.

Figure 3:
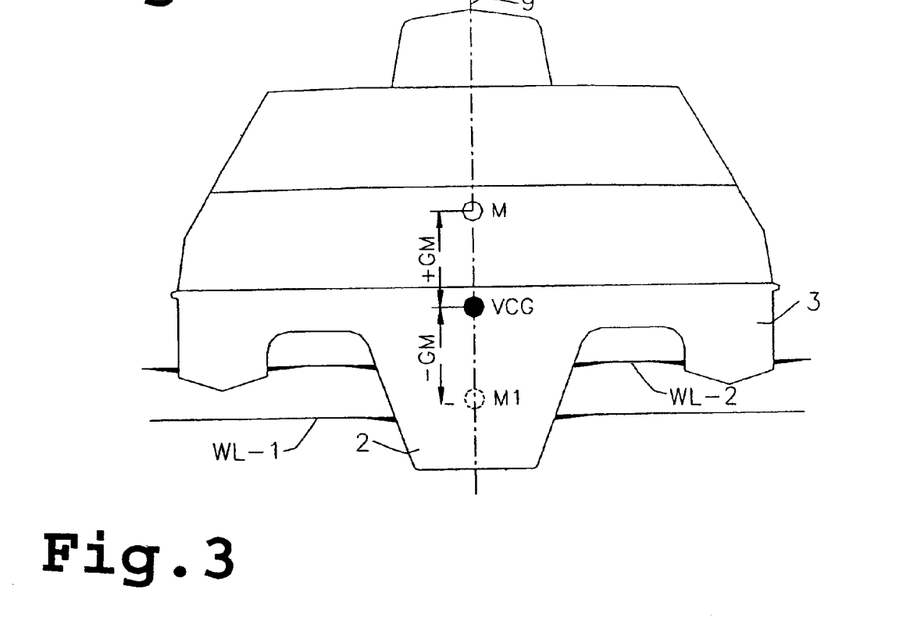
FIG. 3 shows an aft-ship transverse section, including the water line (WL-1) at high speed mode, the water line (WL-2) at low speed mode, and vertical center of gravity (VCG) and the metacentric point (M) at low speed mode and at high speed mode (M1)
Figure 4A:
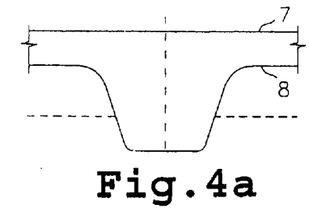
FIGS. 4a–4d show optional transverse sections of the aft part of the main hull below the wet deck level.
Figure 4B:
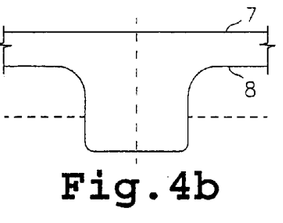
Figure 4C:
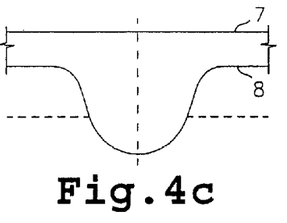
Figure 4D:
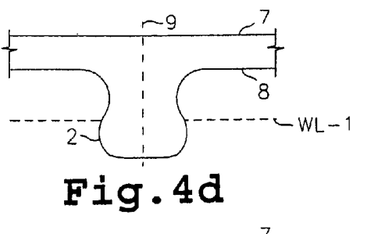
Figure 4E:
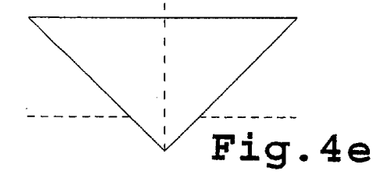
FIGS. 4e–4m show optional transverse sections of the forward part of the main hull below the maid deck level.
Figure 4F:
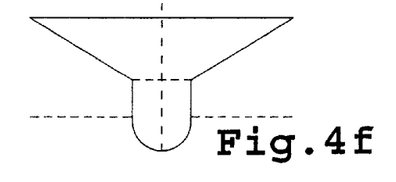
Figure 4G:
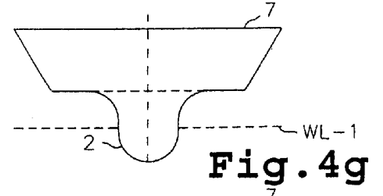
Figure 4H:
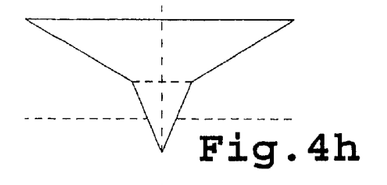
Figure 4I:
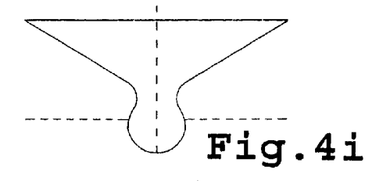
Figures 4J, 4M:
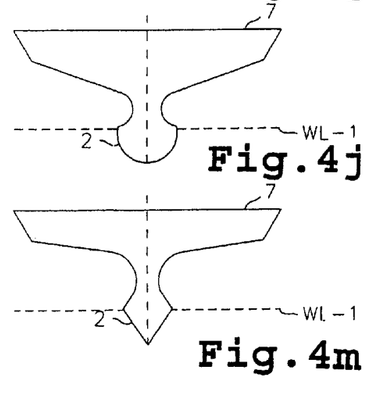
Figure 4K:
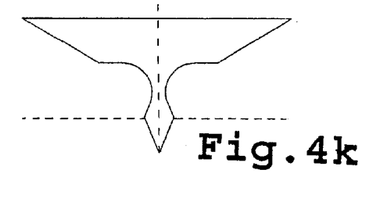
Figure 4L:
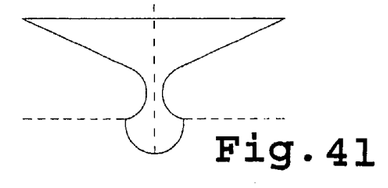

When the vessel moves forward at lower speed, or is at rest in the water, the lift force from the foil system is reduced or canceled. Thus, the draft will increase and both side hull elements (3) will be submerged as indicated by the water line (WL-2) on FIG. 1 and 3. The side hull elements will thus provide the required hydrostatic stability.

Figure 5:
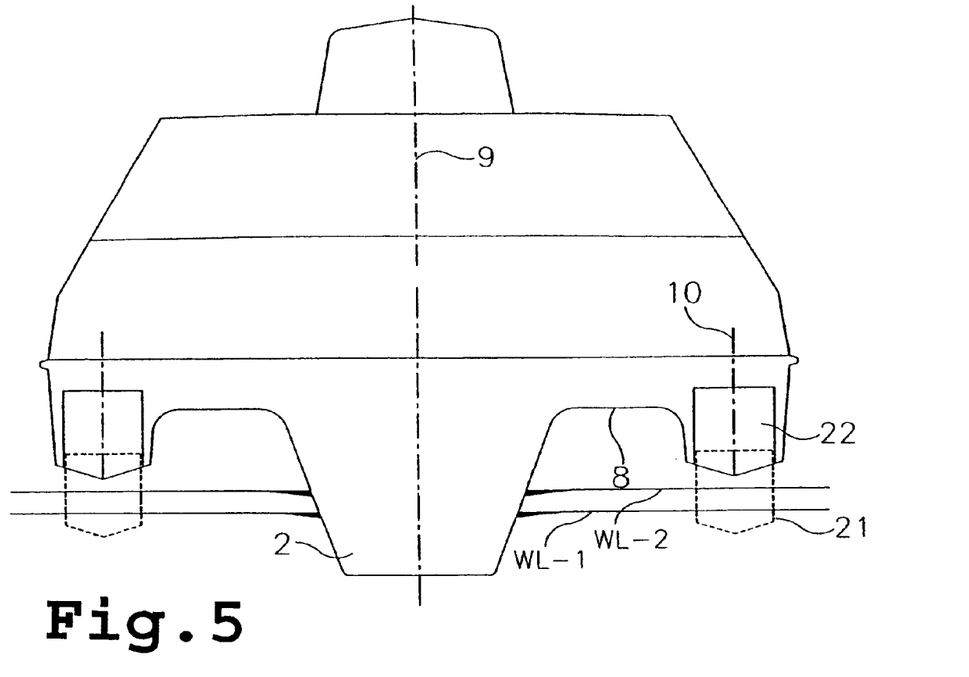
FIG. 5 shows a vessel according to the invention in an aft view, indicating the adjustable sidehulls.
Figure 6:
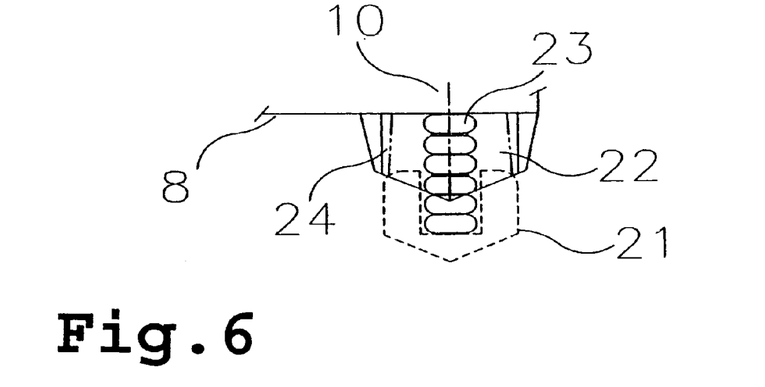
FIG. 6 shows details in a transverse section of the height adjustable sidehulls on a vessel according to the invention, indicating the operating principle.

A way to adjust the side hull elements is indicated on FIG. 5 and 6. The adjustment of the side hull elements (3) may principally take place in any technical feasible way, for example by means of suitable flotation element (21) that is forced out of its normal stored compartment (22) within the side bull element by means of injecting fluid into a piston device that forces the said element downwards until it is sufficiently displaced in the water, as indicated on FIG. 5. In this way the hydrostatic unstable central hull element can be made stable, and the immersion of the flotation elements can be continuously adjusted, even when operating without a stabilizing foil system.

Another method is that the flotation elements integrated in the side hull elements are kept in lower position at a given depth or displacement when the vessel moves forward at a lower speed, or is at rest in the water. When the speed increases and the hydrofoil system provide the required dynamic stability, said flotation elements are temporary lifted such that a desired clearance to the water line is obtained. Such an arrangement may be provided by flotation elements (21) that is connected to the above located wet-deck (8) by means of a plurality of pneumatic or hydraulic actuators (23) located between these (8, 21), in addition to an air sealed flexible membrane (24) fastened to said adjustable flotation elements and the above located wet-deck. The actuators (23) may be connected to a common or individual pressure accumulator provided with the required permanent pressure, such that it keep the actuators and the adjustable elements in a permanent lower position, retained by the flexible membrane (24) that completely surrounds said elements and the internally located actuators. Lifting of the flotation elements are provided by applying a negative pressure to the internal volume (22) within the flexible membrane by use of electrically driven vacuum pumps. Thereby the relatively large internal area will execute a sufficient vertical lift force that exceeds the opposing vertical forces generated by the pressurized hydraulic or pneumatic actuators (23), so that said actuators become compressed, which results in that the flotation elements temporarily will be lifted to an upper position. The electrical vacuum pumps can be started manually from the bridge, while the controller signal that disengages the said pumps may be provided by the vessel's permanent electronic feedback system, such as the speed log and roll indicator. This will secure that the vacuum pumps automatically will be disengaged at a certain condition or situation, for example a given maximum roll angle or a minimum speed. The flotation elements will then automatically be lowered back into their normal displaced position.

Figures 7A, 7B:
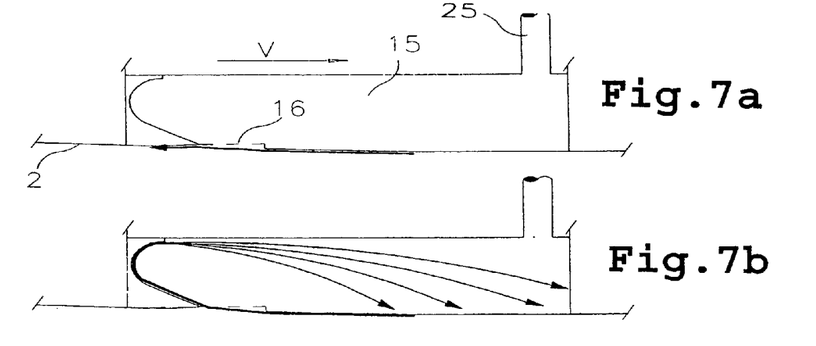
FIGS. 7a–7g illustrate the operating principle of the water ballast system.
Figure 7C:
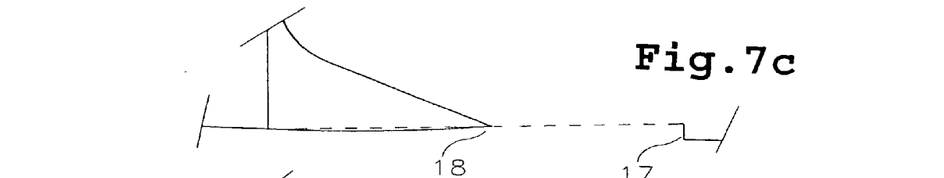

The drawback connected to this method is that it is relatively complicated and cost demanding. For smaller size vessel, like 30–60 m, it will result in relatively large increase of weight. For larger size vessel, however, this is not necessarily the case, since it may actually reduce the weight, depending on the overall size and the actual level of the wet-deck above the waterline. The advantage is that it makes it possible to reduce the draft of the sidehulls when the vessel is operating in the higher speed mode, which in effect will reduce the chances of side hull elements interfering with waves. Compared to the water ballast method, which will be described in the following, it will reduce maximum draft as well as drag at low speed, since the increased displacement at lower speed is avoided. Another method is that the vessel is equipped with a separate water ballast tank (15) as shown on FIG. 1 and 7, structurally integrated into the bottom of the central hull element (2), and located a distance forward of the vessel's transom, preferably aft of the longitudinal center of gravity (LCG). At the aft part of the tank a suitable formed opening (16) is located, at a given distance aft of a vertical step (17) in the bottom plating. When the craft is at rest, and with a forward speed below a given value, the water will enter into the tank, as illustrated on FIG. 7b. The maximum speed at which this takes place, is given by the longitudinal length of the opening (16) and the vertical distance between the forward located step (17) and the aft located toe (18), as well as the static pressure-head of the water. When the speed is above this value, the water flow will separate at the vertical step (17). At increased speed the direction of the water flow will move more towards the horizontal plane, until it at a given speed no longer will hit the toe on the inclined aft part of the opening, but pass underneath this, as illustrated on FIG. 7a. Under this condition the ballast tank will no longer be scooping water, but gradually being drained due to the so-called ejector principle, until it is completely empty. At a given lower speed, the water flow will again hit the toe, become separated and scooped into the tank until it is filled. The tank is equipped with an air pipe (25) for ventilation to the atmosphere in order to avoid internal vacuuming and pressurizing of the tank.

Figure 7D:
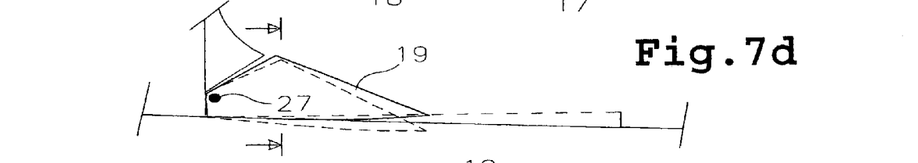
Figure 7E:
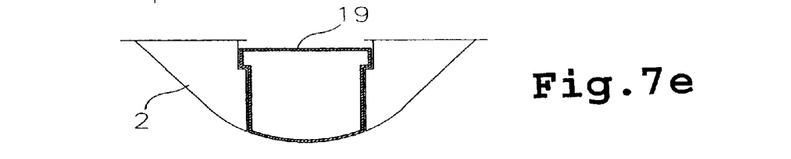

Above described procedure requires a condition with a certain degree of idealization, where the static pressure head, given by the draft of the vessel, is approximately constant. This, of course, is naturally not always the case since it is influenced by the vessel load condition, pitch, foil generated lift and waves. To cure this problem, a controllable wedged shoe (19) can be installed at the aft part of the opening, as indicated on FIG. 7d. This is hinged at a point (27) at the aft part so that its angular position freely can be regulated up and down. The bottom of the shoe is preferably shaped such that it has an arc shape in the longitudinal direction. The toe of the shoe is wedge-formed to easily allow separation of the water flow. While the vessel is at rest, or moves forward below a given speed value, the shoe will be tilting downwards in the vertical plane as illustrated by the dashed lines on FIG. 7d, such that the toe of the shoe protrudes sufficiently deep in relation to the lower edge of the step (17) in order to secure that the shoe is scooping water. Depending of the vertical position of the toe in relation to the said lower edge of the step, the angle of the hinged shoe will at a given speed be changed by itself when the water flow no longer hits the toe. At this point the water scooping ceases, and the tank is gradually being drained. Under this condition the shoe will be planing on the surface of the water flow due to the planing forces and the vertical momentum about the hinge of the shoe, as long as this is freely supported. As long as the speed is above a given value, the angle of the shoe will regulate itself and adapt to the minor variations of the surface of the water flow, which are influenced by trim and waves, without the toe touching the water plane. When the forward speed again is reduced below a certain value, the water flow will hit the toe, become separated and get scooped into the tank. By connecting a remotely controlled hydraulic cylinder to the shoe, one can to a greater degree control its angular position and thus fill and drain the tank more independent of the vessel's forward speed (V).

Figure 7F:
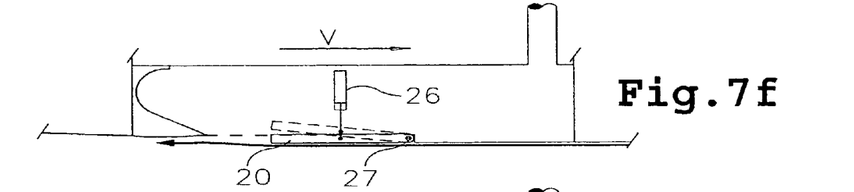
Figure 7G:
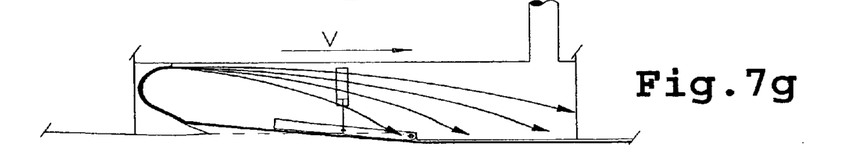

A preferred arrangement to above alternative is the arrangement shown in FIG. 7f–g. Here the hinged shoe is removed and replaced by a permanent toe, as first described. However, a hinged plate (20) is arranged in front of the opening. A remotely operated actuator device (26), being controlled from the bridge, is attached to the plate so that it can be tilted vertically about its forward located hinge (27). When the plate is at its lower position, the water flow will separate at the aft edge of the plate, and pass underneath the toe dependent of the forward speed and the tilting angle of the plate. When the plate is tilted slightly upwards, the water flow will adhere to the plate, depending on the tilting angle and forward speed (v), thus being led into the tank. This method is safer and more advantageous from an operational point of view, compared to the above described shoe alternative. Like the remotely controlled shoe alternative, the priming and draining of the tank can be controlled more independently of the vessels speed and trim, but the latter alternative is likely to be less exposed to operation damage. Dependent of the volume of the tank and its longitudinal position, the above described quick water ballast system can be used to give the sidehulls the required degree of submergence, which means that the vessel will get a rapid transition from dynamic to static stability. Naturally also the transition can be aided by use of the trim foil. This method is advantageous due to its operational simplicity.

What is claimed is:

1. A high speed hybrid marine vessel comprising a central hull element and at least two side hull elements fitted with hydrodynamic lift-generating, roll, heave and pitch controlling hydrofoils, operating in two distinctly different modes, a hydrostatic stable low speed mode, featuring a positive metacentric height (+GM) when said central hull element and at least one of said at least two side hull elements are submerged, and a hydrostatic unstable high speed mode, featuring a negative metacentric height (−GM), with the central hull element partially lifted, partially submerged and the side hull elements partially submerged or entirely out of the water, while said vessel is being dynamically stabilized by the hydrofoil system, wherein:

said central hull element having an integrated stiff deck construction, that in a transverse direction protrudes beyond a width of the central hull element wherein, a lower surface of said deck construction, defined as a wet deck, lays above a second water line when the vessel is at rest at an intact condition;

said vessel has a relation between a largest frame width above the second water line and a largest frame width of the central hull element at a first water line representing any intact upright floating condition of at least 2;

said central hull element has a relation between a largest water line length and a largest water line width at any intact upright floating condition of at least 6;

said central hull element has a substantially rectangular or trapezoidal shaped transverse section below the wet deck level, gradually turning into a U-, V-, Y-shape towards a bow, or combination of one or more U-, V-, and Y-shape;

at least two of said side hull elements further comprising at least one set of side hull elements arranged such that one side hull element is located on each side of the vessel's longitudinal centerline integrated below the wet deck, wherein a depth of said side hull elements is less than a depth of said central hull element;

said wet deck extends from an upper and foremost part of a bow of the side hull elements at least to a transom of the central hull element;

said hydrofoils are located such that a center of hydrodynamic lift is located on or near the vessels longitudinal center of gravity;

said hydrofoils provide a dynamic lifting force at maximum speed corresponding to at least 20% of a lightest weight of the vessel.

2. The high speed marine vessel of claim 1, comprising a fully submerged primary hydrodynamic hydrofoil arrangement, wherein the total transverse span of said hydrofoil arrangement corresponds to at least 50% of the largest overall width of the vessel, wherein said hydrofoil is located proximate to the vessel's longitudinal center of gravity, fixed by at least two struts that transfer the hydrodynamic lifting force to the vessel, wherein at least one remotely controllable flap is provided on each side of the vessel's center line integrated to the aft part of the hydrofoil span, providing hydrodynamic stability by executing a controllable transverse righting momentum about the vessel's centerline.

3. The high speed marine vessel of claim 1, comprising at least one fully submerge secondary hydrofoil arrangement located on said central hull element substantially aft of the vessel's longitudinal center of gravity, wherein a total transverse span of said secondary hydrofoil arrangement is less than 50% of a largest overall width of the vessel, fixed to said central hull element and/or said wet deck by at least one strut for each of said secondary hydrofoil arrangements that transfer hydrodynamic force to the vessel, wherein at least one remotely controllable flap for each of said secondary hydrofoil arrangements is integrated to an aft part of said hydrofoil span, to provide a required pitch regulating momentum about the vessel's longitudinal pivoting center by executing a controllable longitudinal righting momentum when the vessel moves forward at higher speed.

4. The high speed marine vessel of claim 1, comprising two sets of fully submerged secondary hydrofoil arrangements located on said central hull element, wherein one of said sets is located substantially aft of the vessel's longitudinal center of gravity while the other is located substantially forward of said center of gravity, wherein a total transverse span of each set corresponds to less than 50% of an overall width of the vessel, fixed to said central hull element and/or said wet deck by at least one strut for each set that transfer hydrodynamic force to the vessel, wherein at least one remotely controllable flap for each set of said hydrofoil arrangements is integrated to an aft part of said hydrofoil span, to provide a required pitch regulating momentum about the vessel's longitudinal pivoting center by executing a controllable longitudinal righting momentum when the vessel moves forward at higher speed.

5. The high speed marine vessel of claim 1, comprising at least two sets of fully submerged primary hydrofoils, wherein one of said sets is located substantially forward of the vessel's longitudinal center of gravity, and one of said sets is located substantially aft of said longitudinal center of gravity, wherein a total transverse span of each set corresponds to at least 50% of a largest overall width of said vessel, fixed by at least two struts for each set that transfer hydrodynamic forces to the vessel, wherein at least one remotely controllable flap for each set is integrated to an aft part of said aft hydrofoil span, while the other flap of said set is integrated to an aft part of the forward hydrofoil span, said flap arrangement providing the required hydrodynamic stability and pitch damping by executing a controllable transverse and longitudinal righting momentum when the vessel moves forward at higher speed.

6. The high speed marine vessel of claim 1, comprising at least one set of fully submerged primary hydrofoils, fixed to the vessel with struts.

7. The high speed marine vessel of claim 1, comprising at least one set of hydrodynamic self-stabilizing surface piercing hydrofoils fixed to the vessel with struts.

8. The high speed marine vessel of claim 1, wherein said side hull elements comprise structurally integrated or independently fastened elements located below said wet deck.

9. The high speed marine vessel of claim 1, wherein said side hull elements are independently adjustable in height over at least a major portion of the length of said side hull elements.

10. The high speed marine vessel of claim 1, wherein said side hull elements are arranged one forward of the other on both sides in the longitudinal direction such that the vessel's longitudinal center of gravity is located between a transom of an aft side hull elements and a bow of a forward side hull elements.

11. The high speed marine vessel of claim 1, wherein said central hull element is equipped with at least one water ballast tank.

12. The high speed marine vessel of claim 11, wherein said water ballast tank is integrated into the submerged part of said central hull element, wherein said central hull element has a permanent opening in its bottom, positioned forward of said transom of said central hull element, and having a vertical step in the bottom plating.

13. The high speed marine vessel of claim 12, wherein said water ballast tank has a structurally integrated wedged toe at the aft part of the opening.

14. The high speed marine vessel of claim 12, wherein said water ballast tank has a self-regulating or remotely controlled separated hinged shoe located in the aft part of the opening.

15. The high speed marine vessel of claim 12, wherein said water ballast tank has a remotely controlled plate located in the forward part of the opening and hinged at a point behind the vertical step.

16. The high speed marine vessel of claim 1, wherein said side hull elements are positioned such that a major portion of them lies aft of the vessels longitudinal center of gravity.

17. The high speed hybrid marine vessel in accordance with claim 1, wherein lifting surfaces are operable to effect lift, as well as heave, roll and pitch control in said modes, and particularly the second mode.

18. The high speed hybrid marine vessel in accordance with claim 1, wherein said side hull elements are positioned such that a major portion of said elements lies aft of the vessel's longitudinal center of gravity.

19. The high speed marine vessel in accordance with claim 1, wherein said side hull elements are positioned such that said elements lie in the vicinity of the vessel's longitudinal center of gravity.

20. A high speed hybrid marine vessel comprising:
at least one central hull element featuring an integrated stiff deck construction that in a transverse direction extends beyond a width of said central hull element, wherein a lower surface of said desk construction is defined as a wet deck lying above any normal water line;
at least two side hull elements forming one set and arranged on each side of said central hull element, each side hull element featuring a depth less than said central hull element's depth; and
one or more hydrodynamic lift-generating hydrofoils or lifting surfaces, wherein:
when said vessel is in any intact upright floating condition,
a ratio between the vessel's largest frame width above a water line, and said central hull elements' largest frame width at any water line on said condition, is greater than or equal to 2, and
on said condition, a ratio between a central hull element largest water line length, and a central hull largest water line width, is greater than or equal to 6;
said central hull element has a substantially rectangular or trapezoidal shaped transverse section below the wet deck level, gradually turning into a U-, V-, or Y-like shape towards the bow, or a combination of said shapes;
said wet deck extends from the side hull elements' upper- and foremost parts and at least to a transom of the central hull element;
said lifting surfaces are located such that their common center of hydrodynamic lift is located proximal the vessel longitudinal center of gravity;
said hydrofoils provide a dynamic lifting force at maximum vessel speed corresponding to at least 20% of the lightest vessel weight;
whereby said vessel by means of said hydrofoils or lifting surfaces is capable of selectively sustaining operation in either of a first and a second distinctly different modes, or in a transition state between said two modes for an extended period of time,
said first mode being a hydrostatically stable mode with the vessel exhibiting a positive metacentric height (+GM), with parts of the central hull element and parts of at least one of the side hull elements displaced below a first water line; and
said second mode being a hydrostatically unstable mode with the vessel exhibiting a negative metacentric height (−GM) with the central hull element partly displaced below a second water line, and the side hull elements partly or entirely above said second water line,
said first water line being closer to said wet deck than said second water line.

21. The high speed hybrid marine vessel in accordance with claim 20, wherein a vessel speed in said first mode is less than a vessel speed in said second mode.

22. The high speed hybrid marine vessel in accordance with claim 20, wherein a vessel speed in said first mode is greater than or equal to a vessel speed in said second mode.

* * * * *